(12) United States Patent
Chuang

(10) Patent No.: US 7,178,933 B1
(45) Date of Patent: Feb. 20, 2007

(54) ILLUMINING DEVICE

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 0 days.

(21) Appl. No.: 11/162,813

(22) Filed: Sep. 23, 2005

(51) Int. Cl.
*F21L 4/00* (2006.01)
(52) U.S. Cl. .............. 362/106; 362/191; 362/396; 362/474
(58) Field of Classification Search .......... 362/105, 362/106, 191, 192, 396, 190, 473–476; D26/39
See application file for complete search history.

(56) References Cited

U.S. PATENT DOCUMENTS 6,283,620 B1 * 9/2001 Taylor et al. ............ 362/105
6,619,813 B1 * 9/2003 Schnell ................... 362/396

* cited by examiner

*Primary Examiner*—Stephen F Husar
(74) *Attorney, Agent, or Firm*—Alan D. Kamrath; Nikolai & Mersereau, P.A.

(57) ABSTRACT

An illumining device includes a base, lamp, and a clip. The base includes two buttons on the top, a dovetail groove between the buttons, and a locking portion between and movable by the buttons. The lamp includes a dovetail movable into the dovetail groove and a locking portion for engagement with the locking portion of the base. The locking portion of the base can be disengaged from the locking portion of the lamp by pressing the buttons. The clip includes a connecting portion secured to the bottom of the base and a clipping portion for clipping a visor of a cap.

12 Claims, 11 Drawing Sheets

ILLUMINING DEVICE

BACKGROUND OF INVENTION

1. Field of Invention

The present invention relates to an illumining device that enables a user to cast light according to his or her sight in a hand-free manner, i.e., the user can do other things with both hands while maneuvering the illumining device.

2. Related Prior Art

Referring to FIG. 11, there is a conventional lamp 1, and a lamp-installing device 2 includes a base 11, a band 12 and a lock 13. The base 11 includes a first side and a second side. The lamp 1 can be installed on and removed from the first side of the base 11. The band 12 is installed on the second side of the base 11. The band 12 forms a loop with a size that can be adjusted in a range. The band 12 can be tied to a bicycle. Thus, the lamp 1 can be installed on the bicycle in order to light up a rider's way in the dark. The lock 13 can lock the band 12 in order to retain the size of the loop formed by the band 12. Thus, the lamp 1 is firmly installed on the bicycle.

The present invention is intended to improve the above-mentioned lamp-installing device.

SUMMARY OF INVENTION

According to the present invention, there is disclosed an illumining device including a base, lamp, and a clip. The base includes two buttons on the top, a dovetail groove between the buttons, and a locking portion between and movable by the buttons. The lamp includes a dovetail movable into the dovetail groove and a locking portion for engagement with the locking portion of the base. The locking portion of the base can be disengaged from the locking portion of the lamp by pressing the buttons. The clip includes a connecting portion secured to the bottom of the base and a clipping portion for clipping a visor of a cap.

An advantage of the illumining device according to the present invention is that the rider can align the light of the illumining device with his sight. That is, the rider can cast the light around him or her, not limited to the front of the bicycle.

Another advantage of the illumining device according to the present invention is that the rider can do other things with both hands while maneuvering the illumining device.

Other advantages and novel features of the invention will become more apparent from the following detailed description in conjunction with the drawings.

BRIEF DESCRIPTION OF DRAWINGS

The present invention will be described through detailed description of three embodiments referring to the drawings.

DETAILED DESCRIPTION OF EMBODIMENTS

Figure 1:
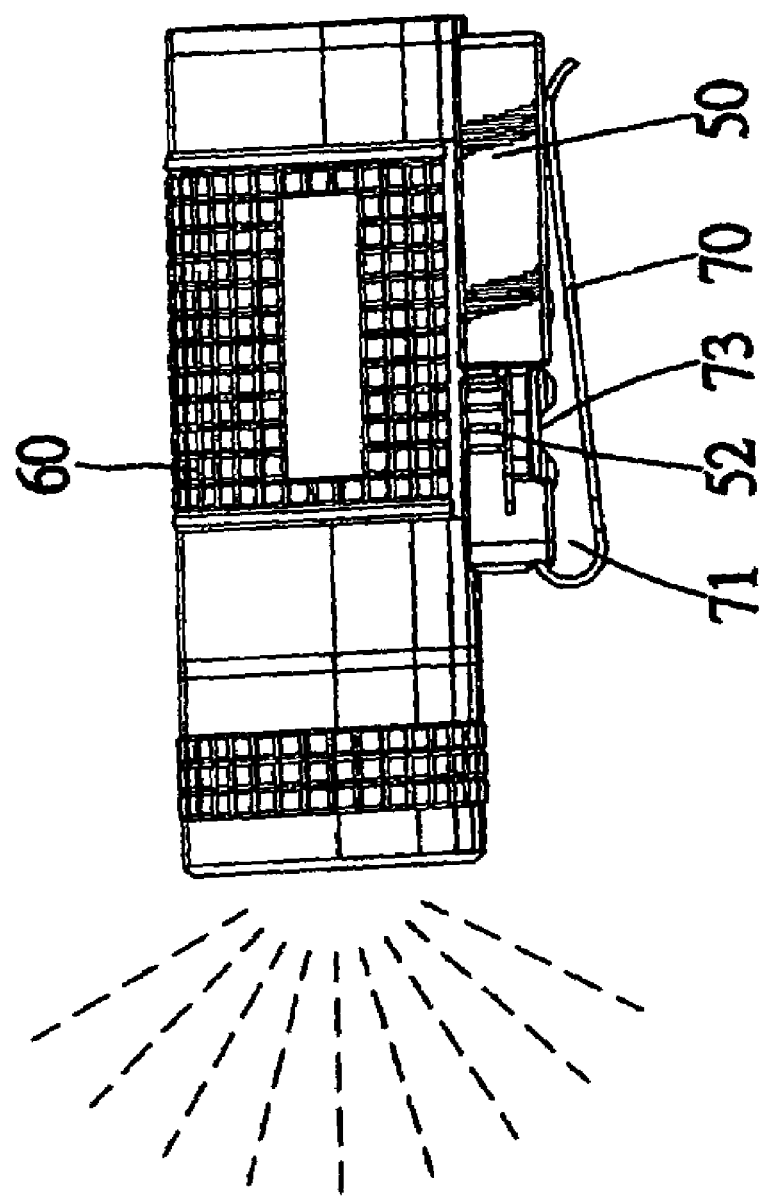
FIG. 1 is a side view of an illumining device according to the first embodiment of the present invention.

Referring to FIG. 1, there is shown an illumining device according to a first embodiment of the present invention. The illumining device includes a base 50, a lamp 60 and a clip 70.

Figure 2:
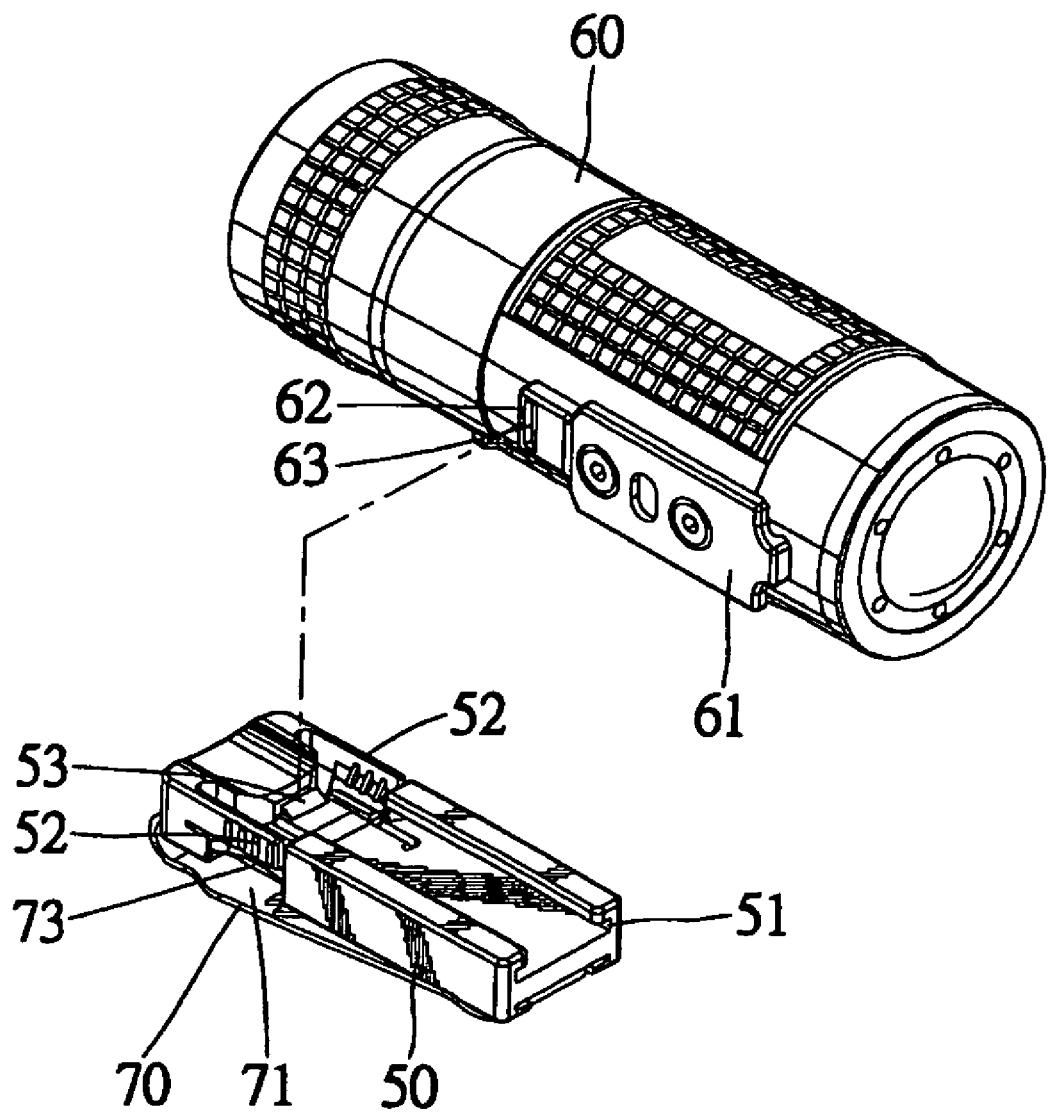
FIG. 2 is an exploded view of the illumining device shown in FIG. 1.

Referring to FIG. 2, in the top of the base 50 is defined a dovetail groove 51 with an open end and a closed end. On the top of the base 50 are formed two buttons 52 between which the dovetail groove 51 is located. Also on the top of the base 50 is formed a latch 53 located between and operable by means of the buttons 52.

The lamp 60 includes a dovetail 61 with a first end and a second end. The first end of the dovetail 61 is used as an insert 62. A recess 63 is defined in the insert 62. The dovetail 61 can be inserted in the dovetail groove 51. When the recess 63 reaches the latch 53, the recess 63 receives and traps the latch 53 in order to keep the dovetail 61 in the dovetail groove 51. That is, the lamp 60 is kept on the base 50.

The buttons 52 can be pushed so that the latch 53 can be removed from the recess 63. Thus, the dovetail 61 can be removed from the dovetail groove 51. In other words, the lamp 60 can be removed from the base 50.

The clip 70 includes a bent shape with a connecting portion 73 at an end and a clipping portion 71 at another end. The connecting portion 73 of the clip 70 is attached to the bottom of the base 50 by several screws (not numbered). The clipping portion 71 is adapted for clipping the visor of a hat as shown in FIG. 3.

Figure 3:
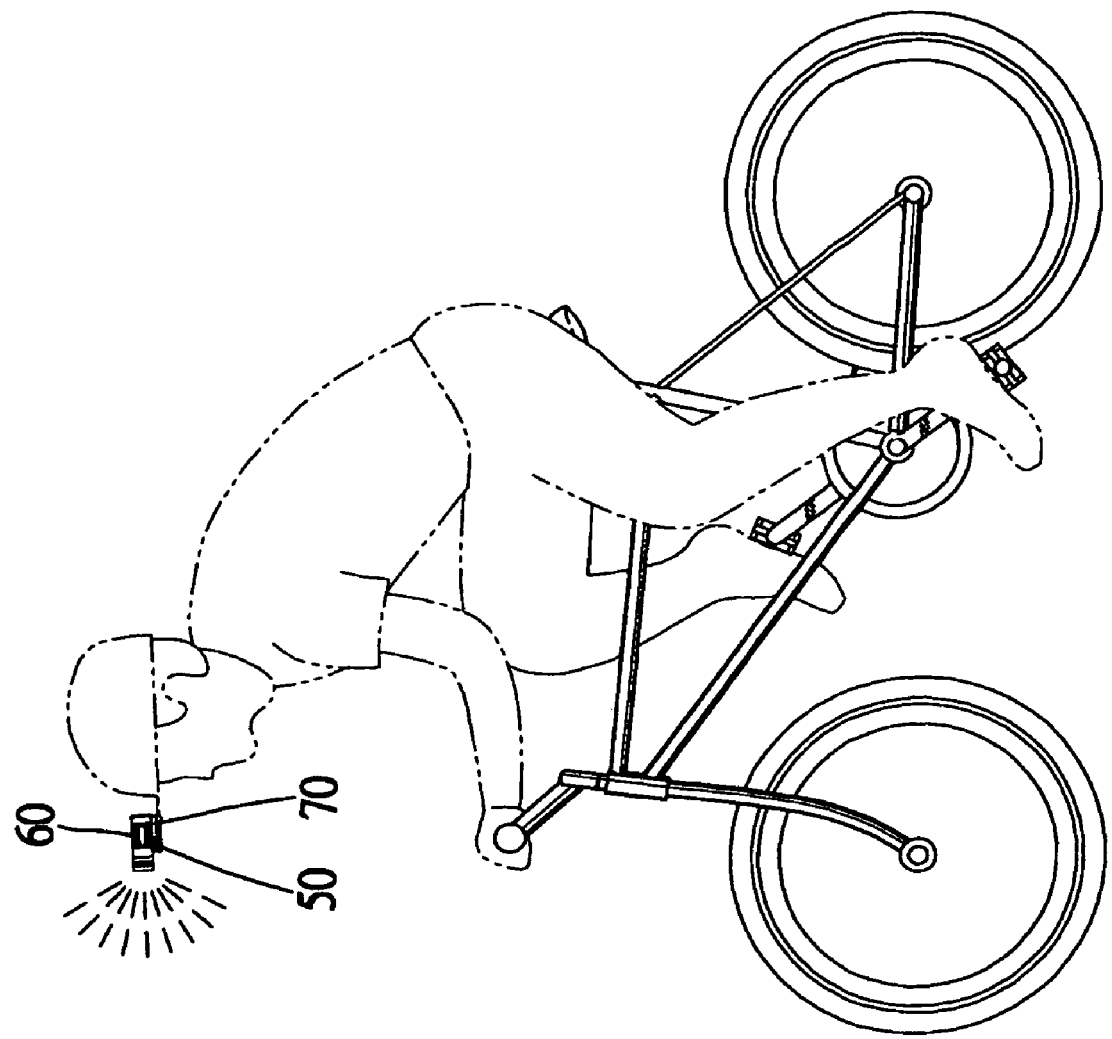
FIG. 3 is a side view of a rider on his bicycle while carrying, on his hat, the illumining device shown in FIG. 1.
Figure 4:
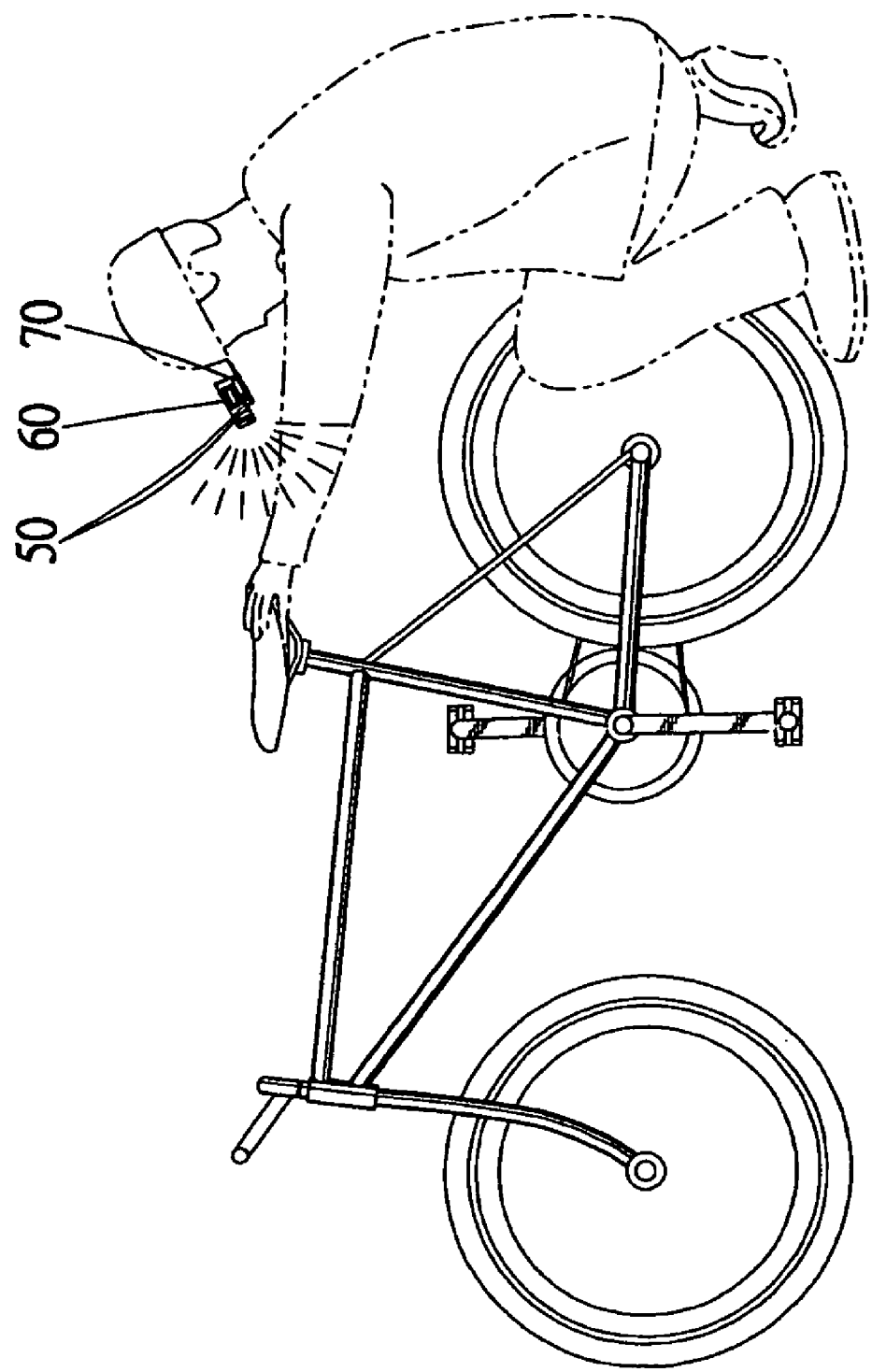
FIG. 4 is a side view of a rider tending his bicycle while carrying, on his hat, the illumining device shown in FIG. 1.

Referring to FIG. 3, a rider who wears a cap (not numbered) is riding his bicycle. Referring to FIG. 4, the rider is tending his bicycle. In ether case, the clip 70 clips the visor of the cap so that the illumining device is installed on the cap. With the illumining device installed on the cap put on his head, the rider can cast light according to his sight in a hand-free manner. In an aspect, the rider can align the light of the illumining device with his sight. In another aspect, the rider can do other things with both hands while maneuvering the illumining device. Moreover, the rider can scan a larger area with the illumining device on the visor of his cap than on the handle of his bicycle.

Figure 5:
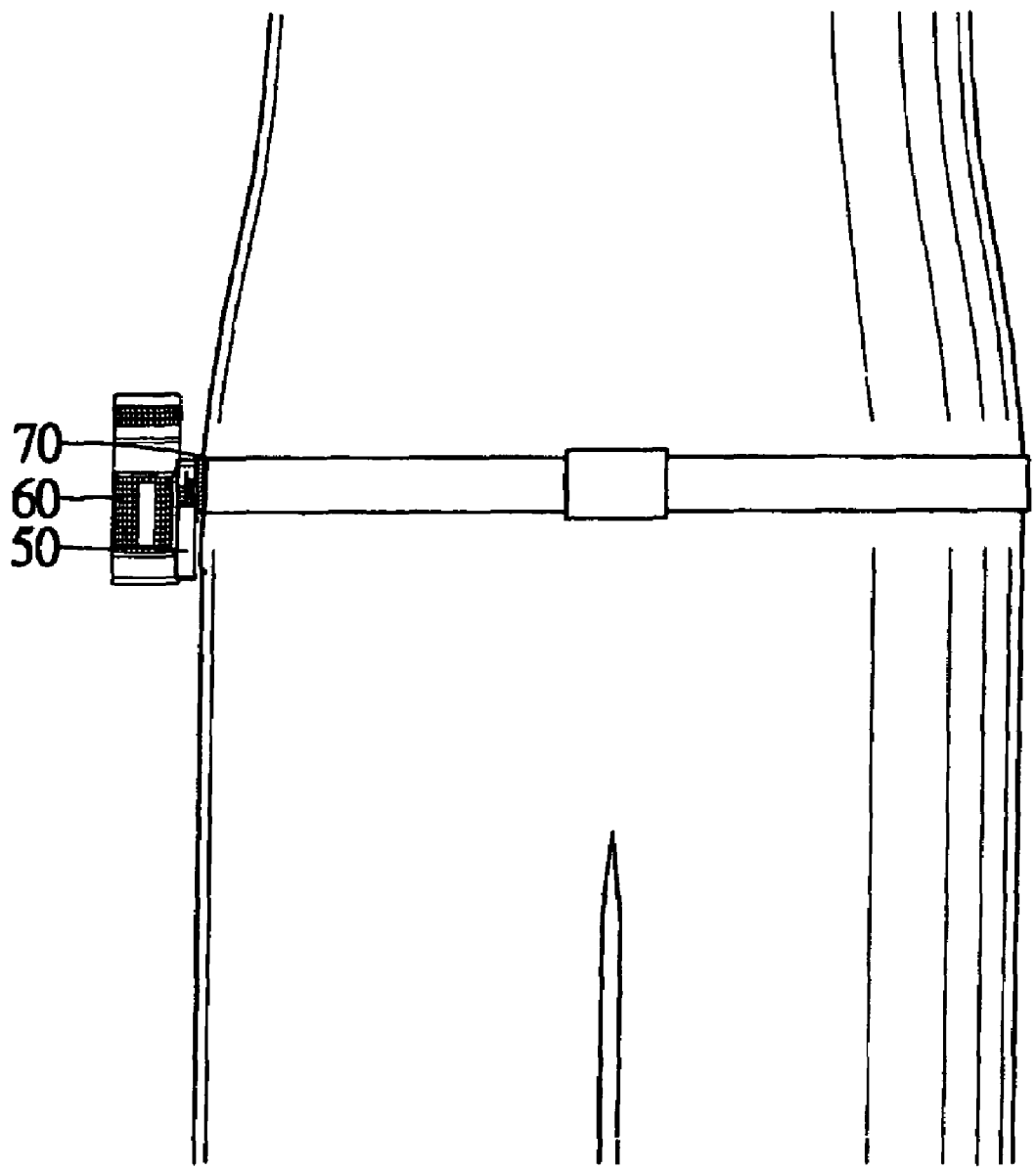
FIG. 5 is a front view of a user carrying, on his waist belt, the illumining device shown in FIG. 1.

Referring to FIG. 5, the clip 70 clips a user's waist belt. The clip 70 can clip to various portions of the user's garment. Although not wearing a cap, the user can cast light according to his or her sight in a hand-free manner. That is, the user can do other things with both hands while maneuvering the illumining device. The use is convenient.

Figure 6:
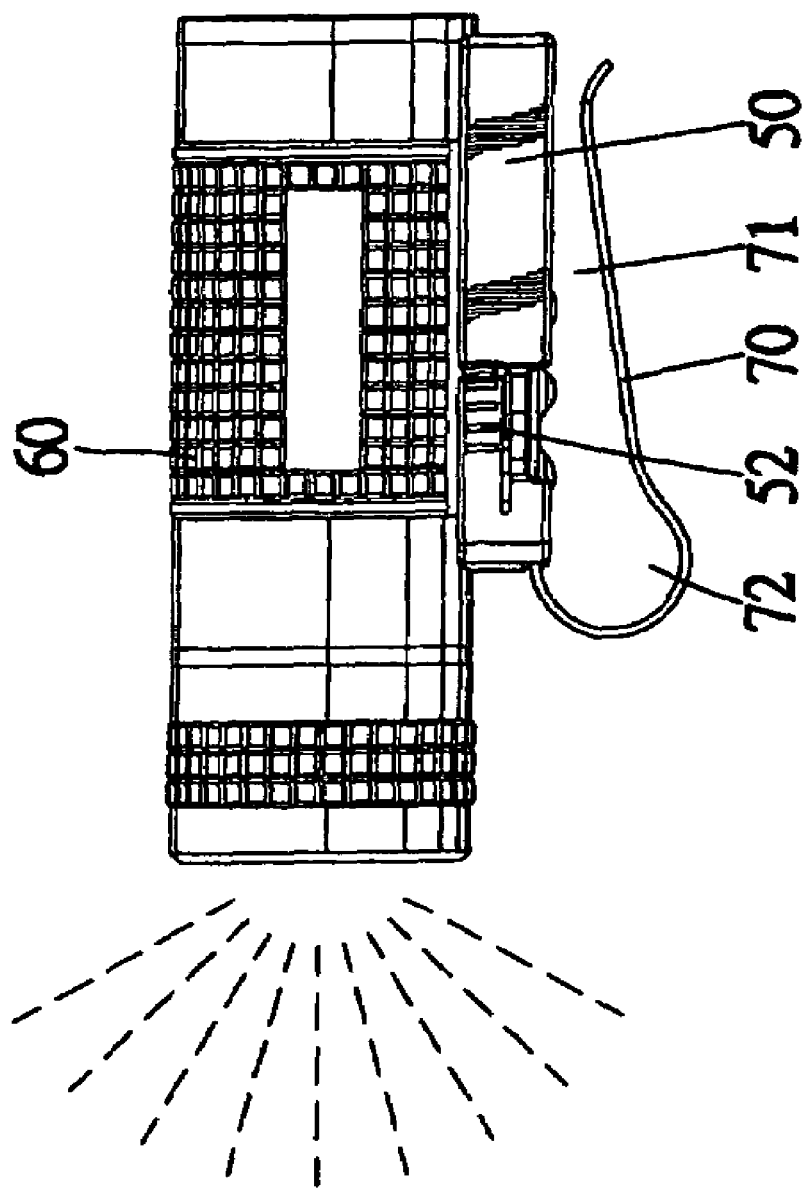
FIG. 6 is a side view of an illumining device according to the second embodiment of the present invention.

Referring to FIG. 6, there is shown an illumining device according to a second embodiment of the present invention. The second embodiment is identical to the first embodiment except that the clip 70 includes a C-shaped portion 72 between the connecting portion 73 and the clipping portion 71.

Figure 7:
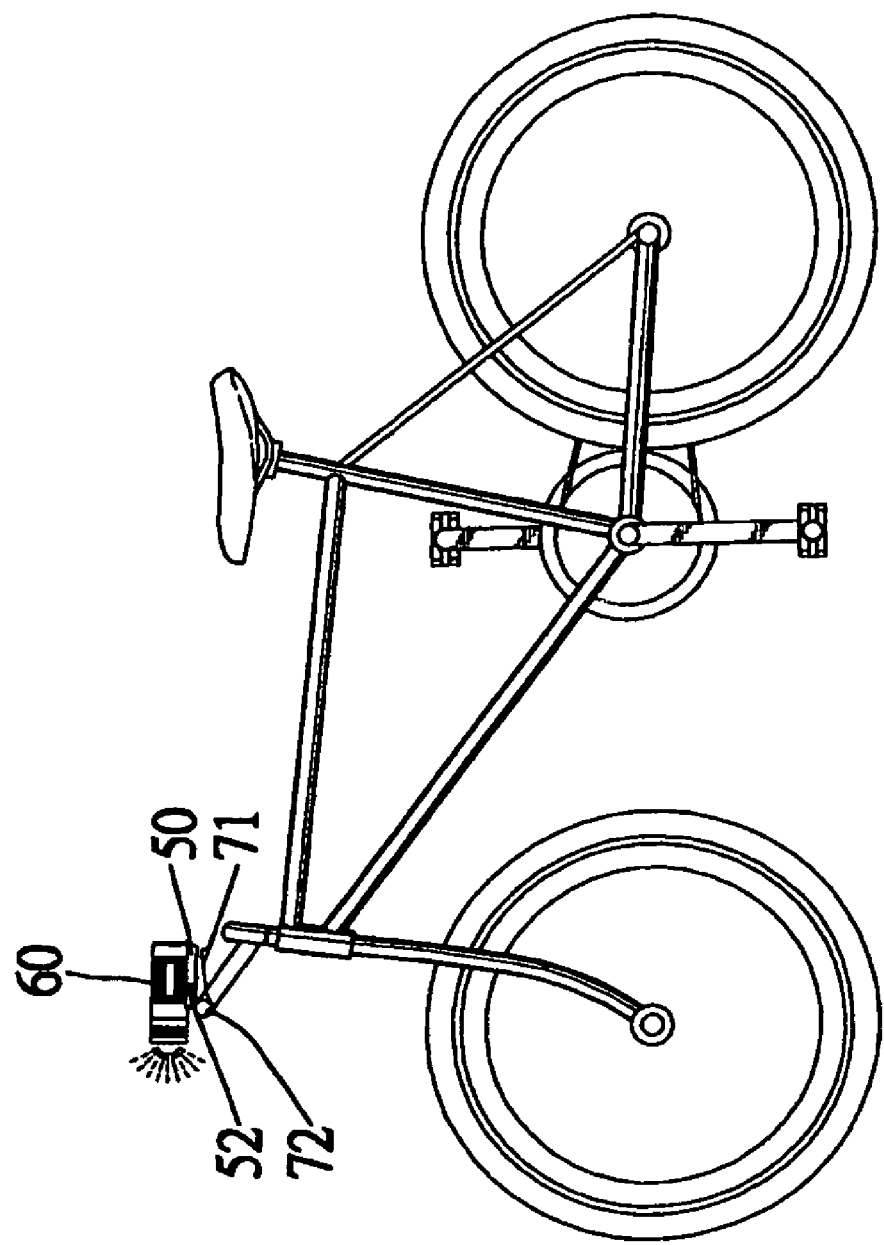
FIG. 7 is a side view of a bicycle on which is installed the illumining device shown in FIG. 6.

Referring to FIG. 7, the C-shaped portion 72 can hold onto the handle of a bicycle. That is, the illumining device can be installed on the bicycle instead of a rider's headgear and garment.

Figure 8:
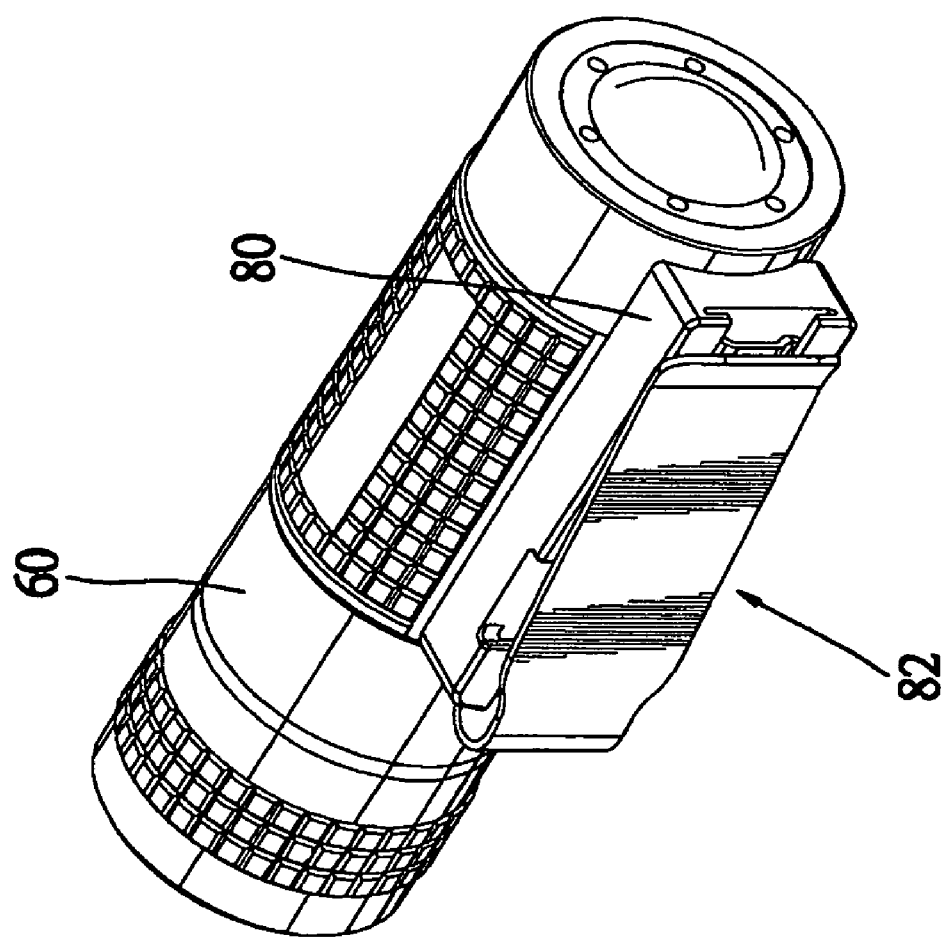
FIG. 8 is a perspective view of an illumining device according to the third embodiment of the present invention.
Figure 9:
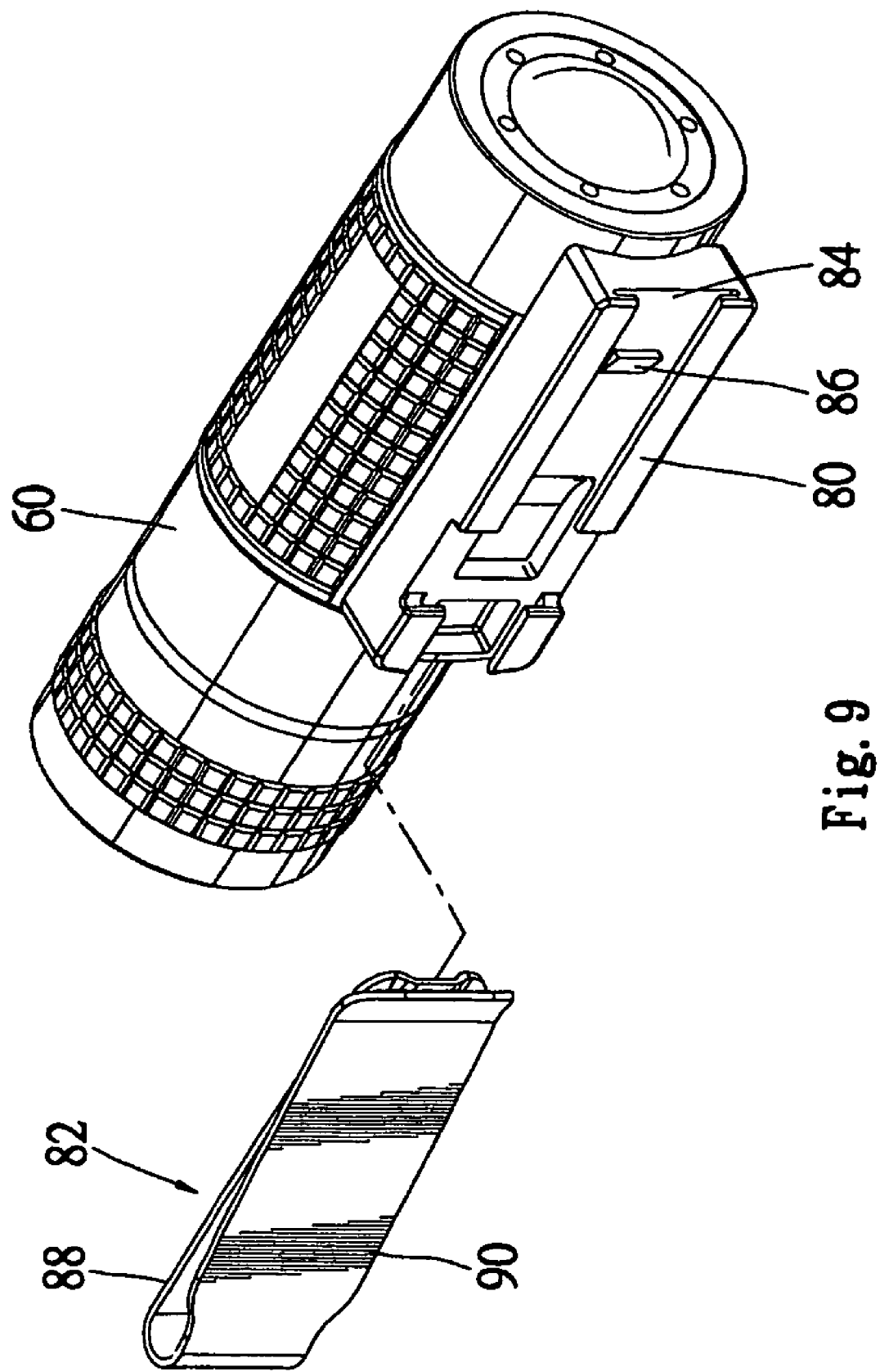
FIG. 9 is an exploded view of the illumining device of FIG. 8.
Figure 10:
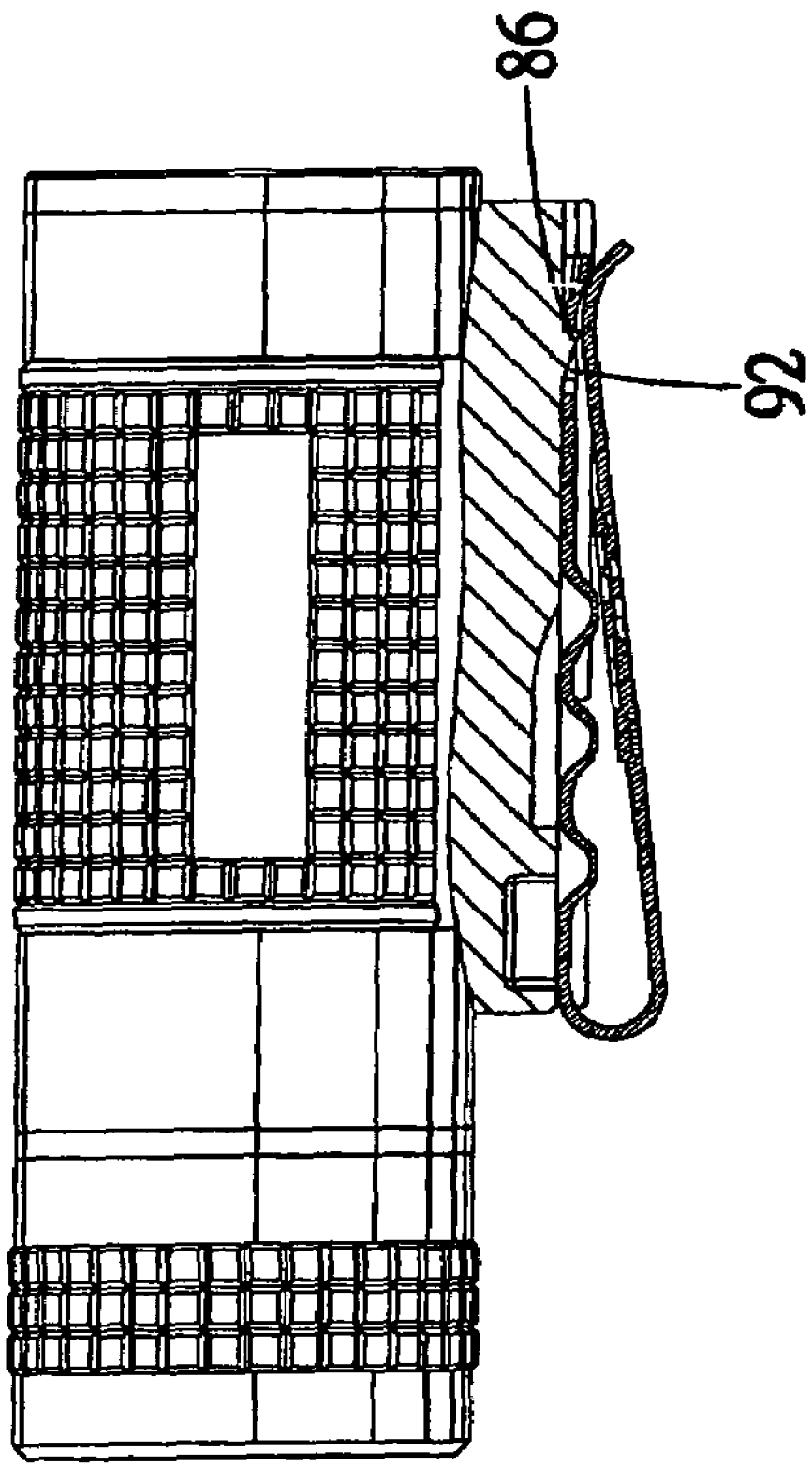
FIG. 10 is a cross-sectional view of the illumining device of FIG. 8.
Figure 11:
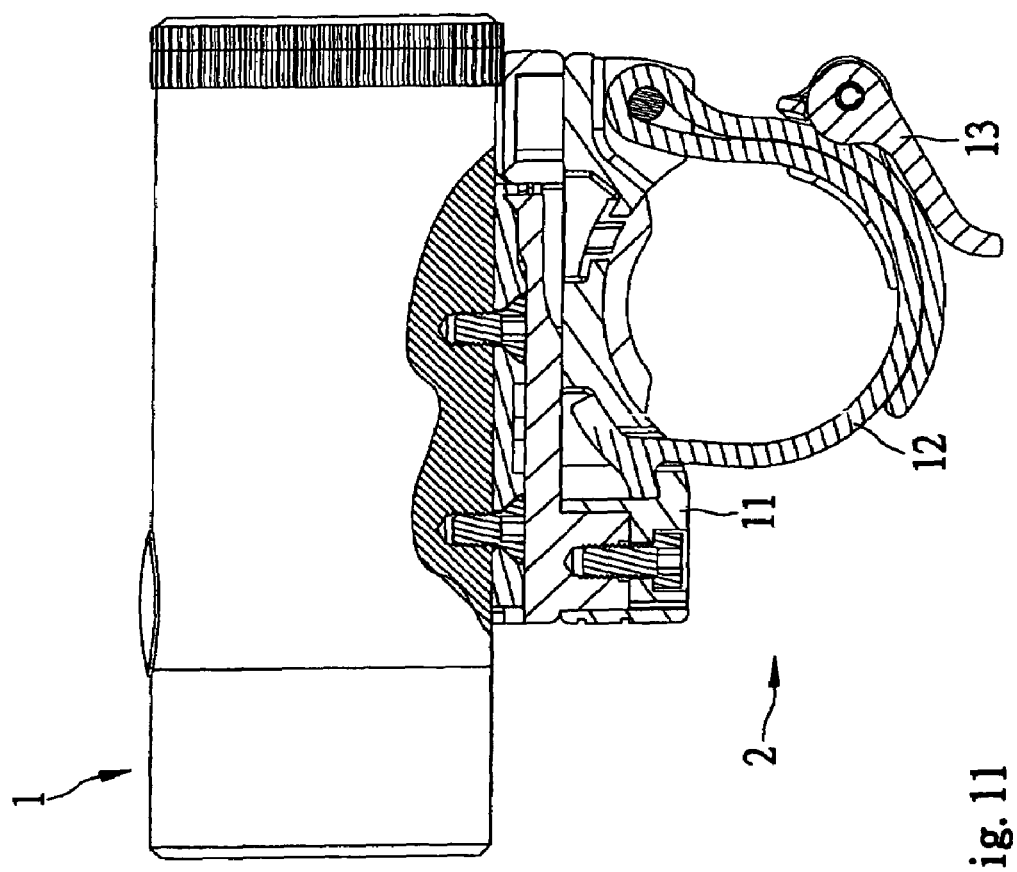
FIG. 11 is a cross-sectional view of a conventional lamp device.

Referring to FIGS. 8 through 10, there is shown an illumining device according to a third embodiment of the present invention. The third embodiment includes a base 80 formed on the lamp 60 and a clip 82 attached to the base 80. The base 80 includes a dovetail groove 84 therein and a wedge 86 on the floor of the dovetail groove 84.

The clip 82 includes a connecting portion 88 defining an aperture 92 and a clipping portion 90 extending from the connecting portion 88. The connecting portion 88 is put in the dovetail groove 84. The free end of the connecting portion 88 slides on the wedge 86. Finally, the aperture 92 receives the wedge 86. Thus, the connecting portion 88 is locked to the base 80.

The illumining device according to the present invention exhibits the follow advantages.

Firstly, the rider can align the light of the illumining device with his sight. That is, the rider can cast the light around him, not limited to the front of the bicycle.

Secondly, the rider can do other things with both hands while maneuvering the illumining device.

Thirdly, the user can install the illumining device on various portions of his or her garment. Although not wearing a cap, the user can cast light according to his or her sight in a hand-free manner. That is, the user can do other things with both hands while maneuvering the illumining device.

The present invention has been described through the description of the embodiments. Those skilled in the art can derive variations from the embodiments without departing from the scope of the present invention. For example, the latch 53 may be formed on the lamp 60, and the recess 63 defined in the base 50. Moreover, the dovetail groove 51 may be defined in the lamp 60, and the dovetail 61 formed on the base 50. Hence, the embodiments shall not limit the scope of the present invention defined in the claims.

What is claimed is:

1. An illumining device comprising:
   a lamp;
   a base attached to the lamp in a removable manner; and
   a clip attached to the base in order to clip a visor of a cap, wherein the lamp comprises a dovetail formed thereon and a locking portion, wherein the base comprises at least one button on the top, a dovetail groove in order to receive the dovetail and a locking portion movable by the at least one button for engagement with the locking portion of the lamp so that the locking portion of the base can be disengaged from the locking portion of the lamp by pressing the at least one button, wherein the clip comprises a connecting portion secured to the bottom of the base and a clipping portion extended from the connecting portion.

2. The illumining device according to claim 1 wherein the dovetail groove comprises an open end through which the dovetail can be moved therein and a closed end for stopping the dovetail.

3. The illumining device according to claim 1 wherein the locking portion of the base is a latch, wherein the locking portion of the lamp is a recess for receiving the latch.

4. The illumining device according to claim 1 wherein the locking portion of the lamp is a latch, wherein the locking portion of the base is a recess for receiving the latch.

5. The illumining device according to claim 1 wherein the clip comprises a C-shaped portion for gripping a bicycle handle, with the C-shaped portion located between the connecting portion and the clipping portion.

6. The illumining device according to claim 1 wherein the at least one button comprises two buttons, with the dovetail groove being between the two buttons, with the locking portion being between and moveable by the two buttons.

7. An illumining device comprising:
   a lamp;
   a base attached to the lamp in a removable manner; and
   a clip attached to the base in order to clip a visor of a cap, wherein the lamp comprises at least one button thereon, a dovetail groove and a locking portion movable by the at least one button, wherein the base comprises a dovetail put in the dovetail groove and a locking portion for engagement with the locking portion of the lamp so that the locking portion of the lamp can be disengaged from the locking portion of the base by pressing the at least one button, wherein the clip comprises a connecting portion secured to the bottom of the base and a clipping portion extended from the connecting portion.

8. The illumining device according to claim 7 wherein the dovetail groove comprises an open end through which the dovetail can be moved therein and a closed end for stopping the dovetail.

9. The illumining device according to claim 7 wherein the locking portion of the base is a latch, wherein the locking portion of the lamp is a recess for receiving the latch.

10. The illumining device according to claim 7 wherein the locking portion of the lamp is a latch, wherein the locking portion of the base is a recess for receiving the latch.

11. The illumining device according to claim 7 wherein the clip comprises a C-shaped portion for gripping a bicycle handles, with the C-shaped portion located between the connecting portion and the clipping portion.

12. The illumining device according to claim 7 wherein the at least one button comprises two buttons, with the dovetail groove being between the two buttons, with the locking portion being between and moveable by the two buttons.

* * * * *